(12) United States Patent
Aubin

(10) Patent No.: US 12,139,021 B2
(45) Date of Patent: Nov. 12, 2024

(54) METHOD FOR MEASURING ENERGY CONSUMED BY A SUPPLY NETWORK FOR POWERING VEHICLES

(71) Applicant: Faiveley Transport Tours, Saint-Pierre-des-Corps (FR)

(72) Inventor: Philippe Aubin, Chanceaux sur Choisille (FR)

(73) Assignee: Faiveley Transport Tours, Saint-Pierre-des-Corps (FR)

( * ) Notice: Subject to any disclaimer, the term of this patent is extended or adjusted under 35 U.S.C. 154(b) by 242 days.

(21) Appl. No.: 17/909,291

(22) PCT Filed: Mar. 2, 2021

(86) PCT No.: PCT/EP2021/055175
§ 371 (c)(1),
(2) Date: Sep. 2, 2022

(87) PCT Pub. No.: WO2021/175847
PCT Pub. Date: Sep. 10, 2021

(65) Prior Publication Data
US 2023/0078281 A1 Mar. 16, 2023

(30) Foreign Application Priority Data
Mar. 4, 2020 (FR) ...................... 2002195

(51) Int. Cl.
*B60L 15/20* (2006.01)
*B60L 9/00* (2019.01)
*B60M 3/00* (2006.01)

(52) U.S. Cl.
CPC ............. *B60L 15/2045* (2013.01); *B60L 9/00* (2013.01); *B60M 3/00* (2013.01); *B60L 2200/26* (2013.01); *B60L 2200/30* (2013.01)

(58) Field of Classification Search
CPC .... B60L 15/2045; B60L 9/00; B60L 2200/26; B60L 2200/30; B60L 1/003; B60L 1/02; B60M 3/00; Y02T 10/64; Y02T 10/72
See application file for complete search history.

(56) References Cited

U.S. PATENT DOCUMENTS

| 5,346,163 A | 9/1994 | Momma et al. |
| 2015/0061377 A1* | 3/2015 | Ishikawa .................. B61C 3/02 |
| | | 307/9.1 |
| 2015/0375751 A1* | 12/2015 | Bjorkman ............. B60W 40/00 |

FOREIGN PATENT DOCUMENTS

| EP | 1359049 A1 | 11/2003 |
| EP | 2899055 A1 | 7/2015 |

(Continued)

OTHER PUBLICATIONS

Xubin Sun, Hu Cai, Xiaowei Hou, Mengyang Zhang and Hairong Dong, "Regenerative braking energy utilization by multi train cooperation," 17th International IEEE Conference on Intelligent Transportation Systems (ITSC), Qingdao, China, 2014, pp. 139-144, doi: 10.1109/ITSC.2014.6957680. (Year: 2014).*

(Continued)

*Primary Examiner* — Russell Frejd
*Assistant Examiner* — Brittany Renee Peko
(74) *Attorney, Agent, or Firm* — K&L Gates LLP

(57) ABSTRACT

A method of measuring a reduction in energy consumed by an electricity network supplying a fleet of transport vehicles, said method comprising the following steps:
sending (S1), over a period of time P, at least one activation signal to at least one energy saving device of at least one item of equipment, said activation signal being configured to alternatingly activate and deactivate said energy saving device over the period of time P;

(Continued)

obtaining (S2) a signal of electrical power consumed over the period of time P by said electricity network; and deducing (S3) a reduction in energy consumed by said electricity network in response to said activation signal.

12 Claims, 6 Drawing Sheets

(56) References Cited

FOREIGN PATENT DOCUMENTS

| EP | 3056378 | A1 |   | 8/2016 |   |
|----|---------|-----|---|--------|---|
| EP | 3594047 | A1 |   | 1/2020 |   |
| FR | 3051424 | A1 |   | 11/2017 |   |
| WO | WO-2015055922 | A1 | * | 4/2015 | ............... B60H 1/00 |

OTHER PUBLICATIONS

International Search Report and Written Opinion for corresponding PCT/EP2021/055175 (17 pages).

* cited by examiner

[Fig. 1]
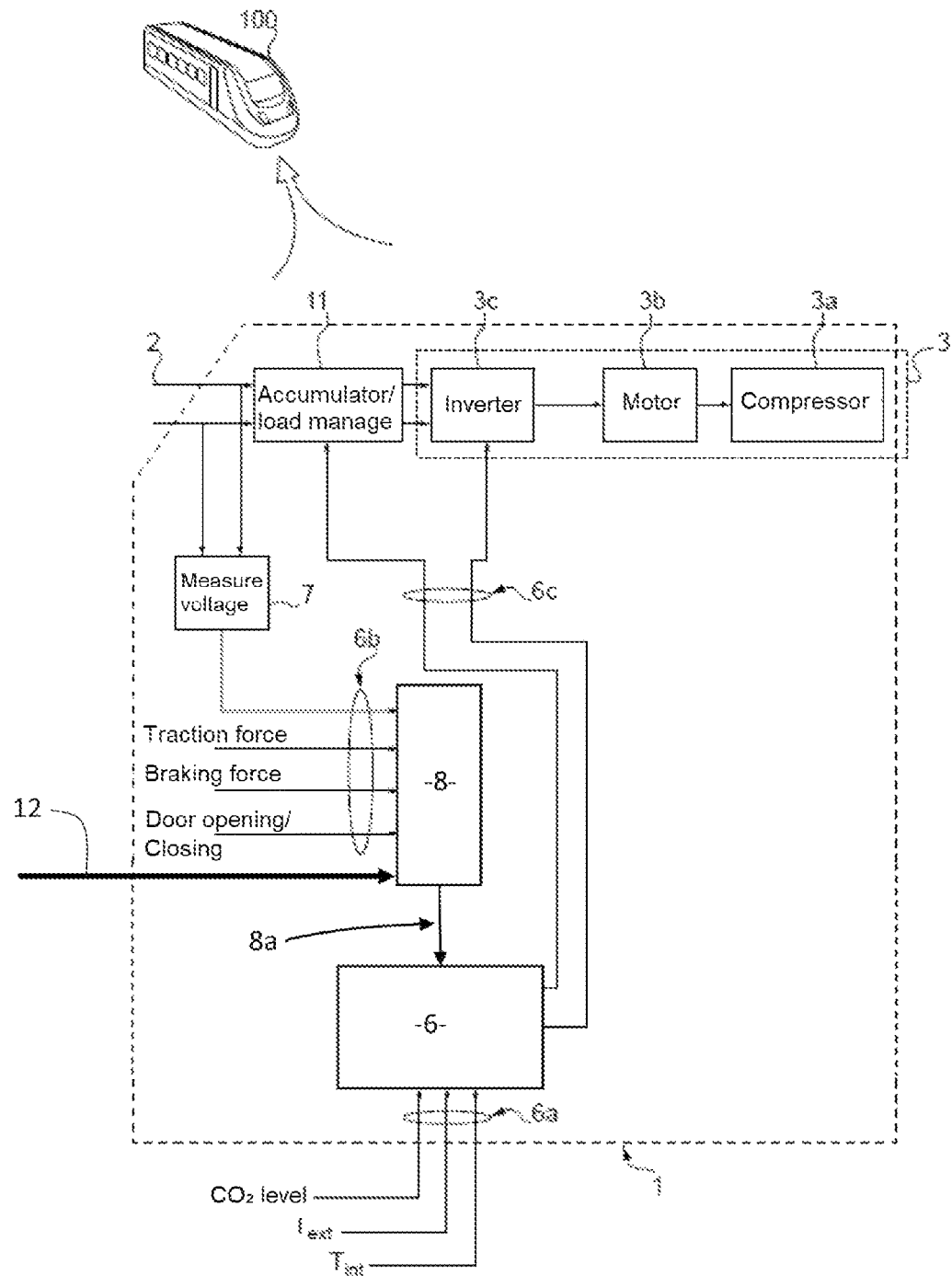

[Fig. 2]
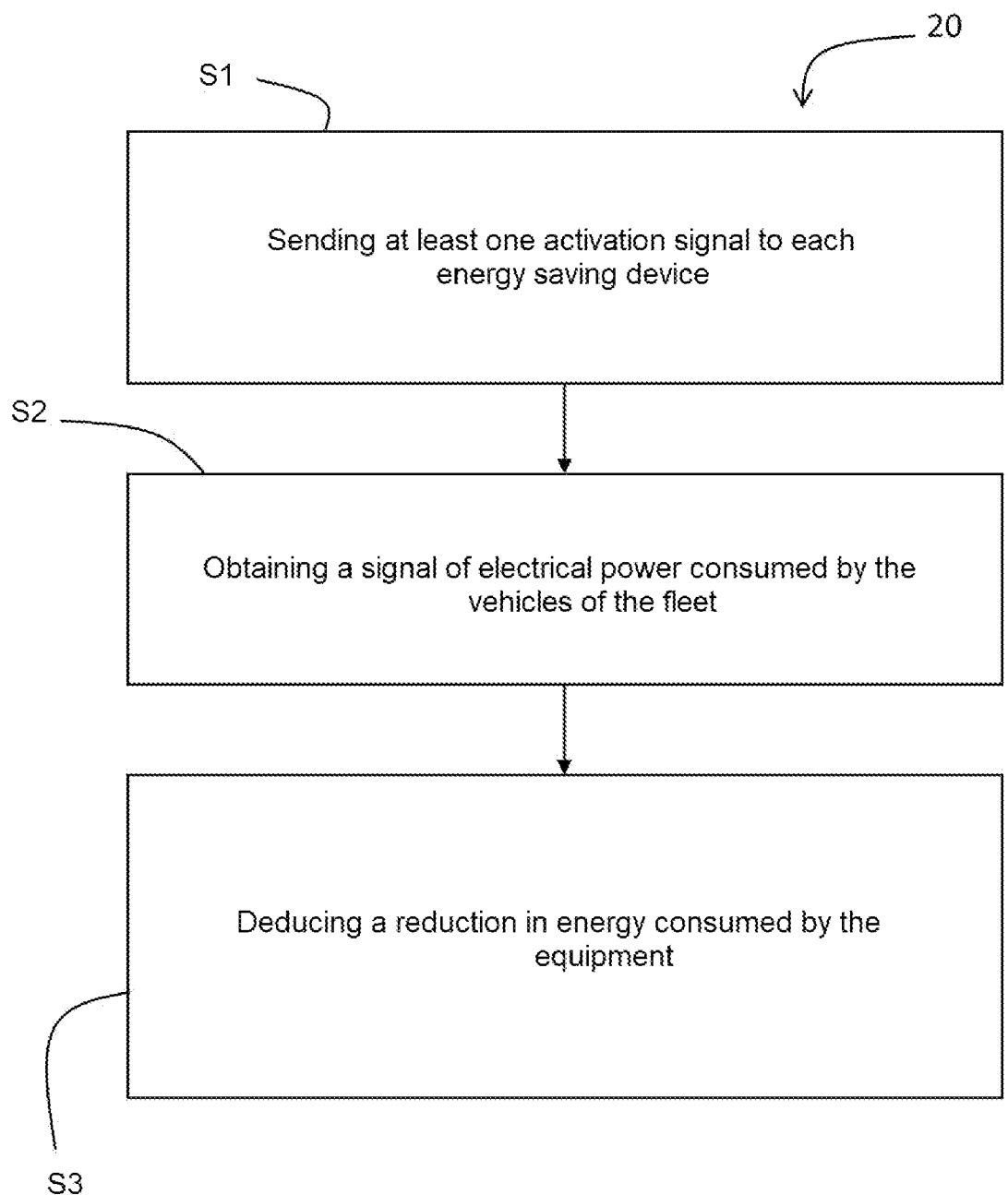

[Fig. 3]
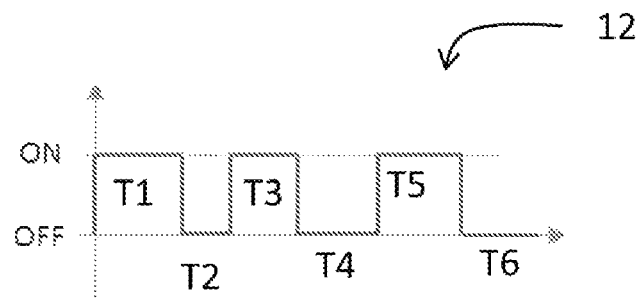
[Fig. 4]
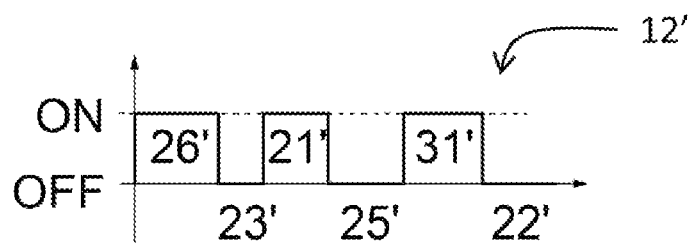
[Fig. 5A]
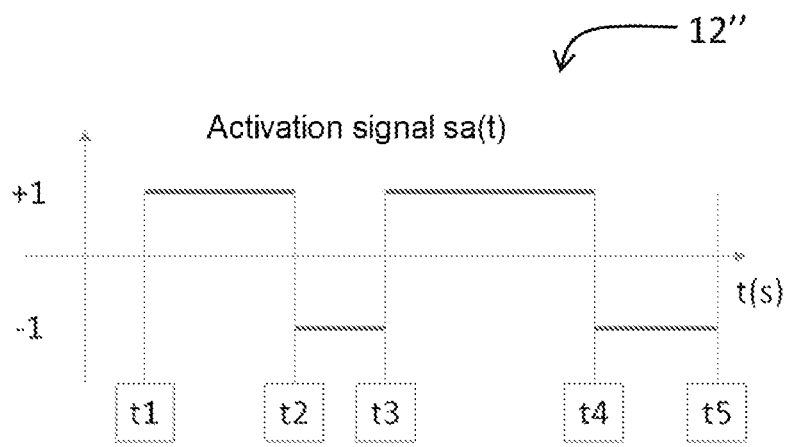

[Fig. 5B]
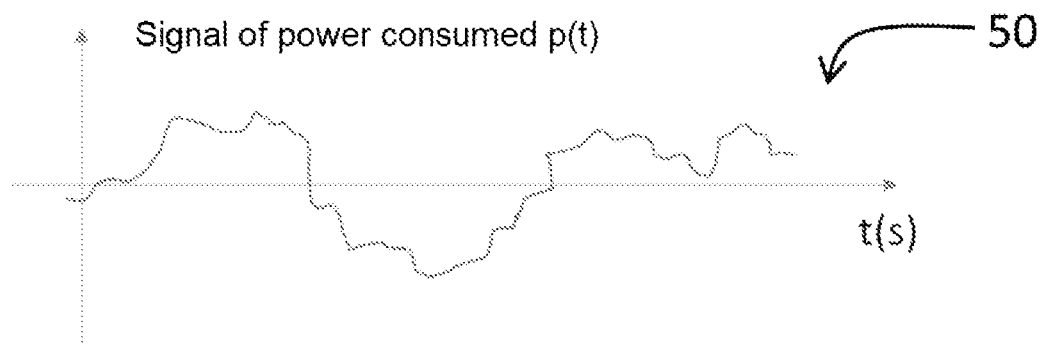

[Fig. 6]
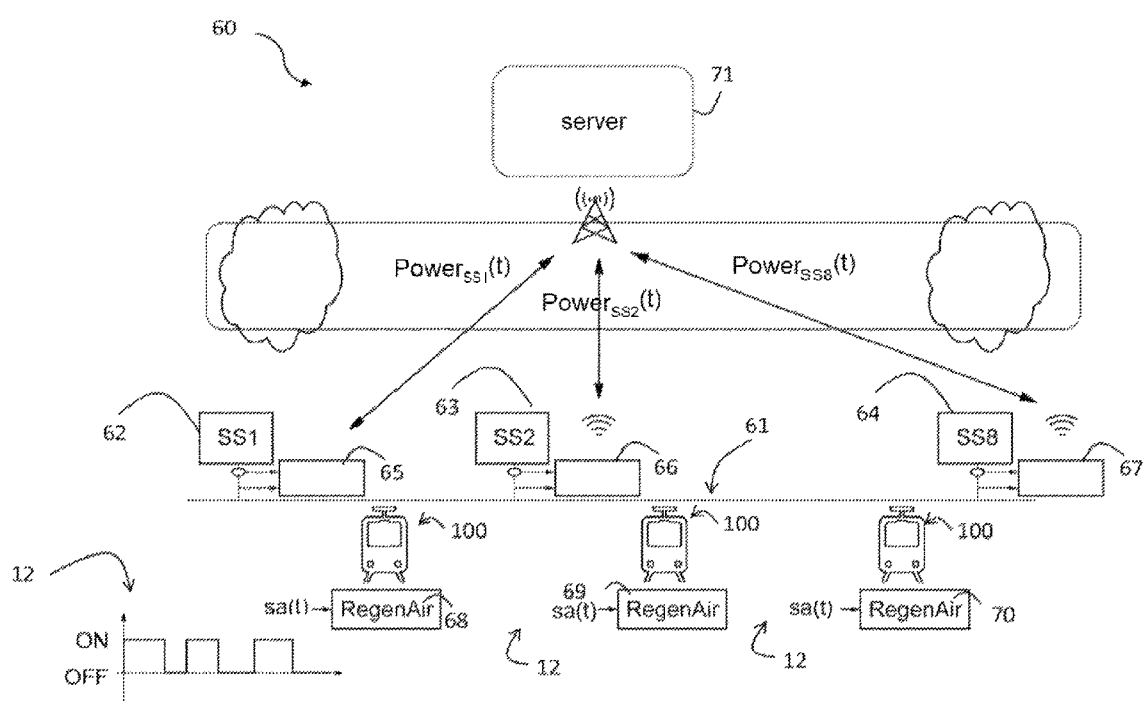

[Fig. 7]
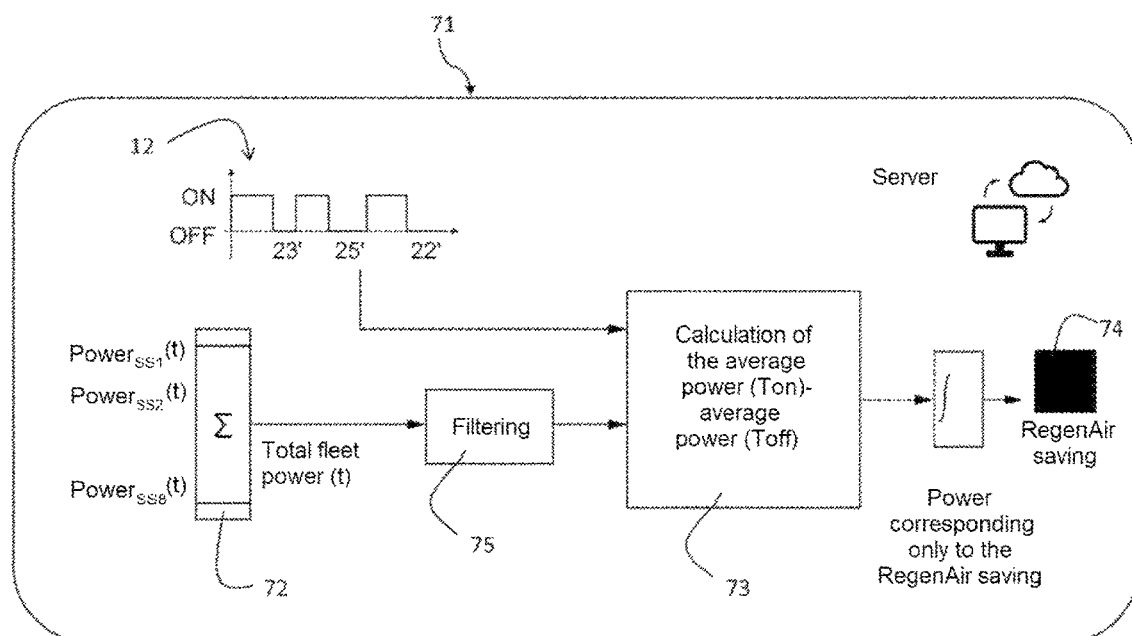

METHOD FOR MEASURING ENERGY CONSUMED BY A SUPPLY NETWORK FOR POWERING VEHICLES

CROSS-REFERENCE TO RELATED APPLICATIONS

This application is a national phase entry of International Patent Application No. PCT/EP2021/055175 (filed 2 Mar. 2021), which claims priority to French patent application no. 2002195 (filed 4 Mar. 2020), the entire disclosures of which are incorporated herein by reference.

BACKGROUND

Technical Field

The present invention relates to a method of measuring an effective reduction in energy consumed by a network for supplying electric passenger transport vehicles.

The invention applies in particular to fleets of vehicles for rail transport for example such as trains, subways, tramways, trolleybuses, etc., supplied by an electricity network.

Discussion of Art

As electric transport networks are becoming increasingly frequented, the electricity networks supplying the vehicles can be under-dimensioned at peak hours.

Furthermore, currently, passenger transport, and in particular rail transport, is one of the largest electricity consumers in France.

Therefore, it is becoming necessary to reduce the consumption of electrical energy in electricity transport networks, in particular at consumption peaks.

In an electric passenger transport vehicle, such as a rail vehicle, the air conditioning system is the equipment that is the highest electrical energy consumer after the vehicle traction system. By way of example, in the case of a tramway, the consumption by the air conditioning system may be more than 50% of the total electrical energy consumption of the tramway.

Such on-board air conditioning systems in these electric vehicles are indispensable. Thus, they make it possible not only to maintain the temperature in the cabin at a pleasant temperature for the passengers, according to the weather conditions outside, but also to renew the air inside the cabin in order to regulate the level of $CO_2$ inside the cabin.

Equipment already exists to reduce the consumption by air conditioning systems. In particular, the system described in the document FR3051424 makes it possible in particular, for a given fleet of vehicles, to re-use the energy produced by certain vehicles in braking phase by air conditioning systems of other vehicles of the fleet. The system is directed furthermore to spread the electrical energy consumption over time of the air conditioning systems of the fleet in order to profit as much as possible from the energy produced by the braking phases of vehicles of the fleet.

The energy savings obtained by this system are significant in terms of volume. Nevertheless, a difficulty arises in quantifying the energy savings obtained. As a matter of fact, since the electrical energy savings are still small in proportion to the total electrical energy consumption, it is difficult, based on the signal of total electrical energy consumed by the vehicles of the fleet, to determine a reduction in the electrical energy consumption by the air conditioning systems. Indeed, as the amplitude of this reduction is small, the energy saving is within the signal noise of the total energy consumed by the vehicles of the fleet.

BRIEF DESCRIPTION

The invention is directed to providing a technical solution making it possible to quantify an effective energy saving in the network supplying a fleet of electric transport vehicles.

In this connection, the present invention concerns a method of measuring a reduction in energy consumed by an electricity network supplying a fleet of transport vehicles, at least one vehicle of the fleet comprising:
- at least one item of equipment configured to be supplied by said electricity supply or by electrical energy produced from the braking of a vehicle of said fleet of transport vehicles, and
- an energy saving device being configured such that, when it is activated, an operation control signal applied to the item of equipment is generated taking into account parameters representing said electrical energy produced from the braking of a vehicle of said fleet of electric transport vehicles;

said method comprising the following steps:
- sending, over a period of time P, at least one activation signal to at least one energy saving device of at least one item of equipment, said activation signal being configured to alternatingly activate and deactivate said energy saving device over the period of time P;
- obtaining a signal of electrical power consumed over the period of time P by said electricity network; and
- deducing a reduction in energy consumed by said electricity network in response to said activation signal.

Thus, by using the activation signal configured to successively activate and deactivate the energy saving device over a period of time, the method makes it possible to evaluate the impact of the energy serving devices on the overall consumption of the electricity network supplying the vehicles of the fleet. As a matter of fact, the use of energy saving devices makes it possible to achieve profitability for the production of electricity by certain vehicles of the fleet, and to use that produced energy for the consumption of equipment of the fleet. In other words, the use of the energy saving device is directed to reducing the energy consumed by the electricity network supplying the vehicle fleet, by consuming, as may be appropriate, the energy produced by a vehicle of the fleet. Therefore, by successively activating the energy device, the method makes it possible not only to quantify the action of the energy saving devices on the overall consumption of electricity of a given vehicle, but also in relation to the network supplying the vehicle fleet operated. The evaluation may be made over a long period of time, in order that isolated events do not contribute to under-evaluating or over-evaluating the energy saving achieved. When several vehicles of the fleet are equipped with energy saving devices, the same activation signal is then sent to each of these energy saving devices.

The frequency spectrum of the activation signal may have a maximum amplitude for frequencies of which the frequency spectrum of the signal of power consumed by said network has a minimum amplitude in the absence of the activation signal, the energy saving devices being either activated or deactivated continuously.

The activation signal may be a digital signal configured to take at least two discrete values comprising a first value corresponding to the activation of the energy saving device, and a second value corresponding to the deactivation of the energy saving device.

By choosing the activation signal in this way, the method makes it possible to evaluate the saving of energy consumed by the vehicle fleet, without being impacted by the conditions of utilization of the vehicles of the fleet. As a matter of fact, the activation signal must be chosen such that it cannot be confused with physical phenomena arising in utilization of the vehicles, for example such as the weather conditions in utilization, and the topology of the rail network. The activation and the deactivation of the energy saving devices must therefore be implemented so that it is not linked with conditions of utilization of the vehicles equipped with such a device.

The activation signal may comprise transition periods, in which the value of the activation signal is constant, said transition periods being longer than a duration of the transition conditions of the energy saving device.

Thus, the energy saving device may implement its activation and its deactivation on reception of the activation signal. The durations of the transition periods may be obtained by random picking.

Such a method can also ensure that the change in the activation signal is entirely random.

Deducing the reduction in energy consumed by said network comprises the following sub-steps:
calculating, over the period of time P, electrical energy consumed by said network when said energy saving devices are activated;
calculating, over the period of time P, electrical energy consumed by said network when said energy saving devices are deactivated; and
calculating a difference between the average energy consumed by said network when the energy saving devices are activated and the average energy consumed by said network when the energy saving devices are deactivated.

Deducing the reduction in energy consumed by said network comprises:
calculating the cross-correlation between the signal of total electrical power consumed by said network and the activation signal over the period of time P.

The vehicles of said fleet of electric transport vehicles may be distributed into sub-sets of vehicles connected to a same sub-station of the electricity supply network, and in this case the step of obtaining a signal of electrical power consumed over the period of time P by said network may comprise the following sub-steps:
determining a signal of electrical power consumed by each sub-set of vehicles, over the period of time P;
calculating the signal of total electrical power consumed by the vehicles of said fleet of electric transport vehicles by the sum of the signals of electrical power consumed by each sub-set of vehicles over the period of time P; and
deducing the signal of electrical power consumed over the period of time P by said network.

The signal of electrical power consumed by each sub-set of electric transport vehicles may be determined and transmitted to a server by each sub-station of the electricity network.

The sending step may be carried out by the server which sends a same activation signal simultaneously to each energy saving device of the fleet of electric transport vehicles.

The sending step may be carried out by a memory carried in each item of equipment, said activation signal being stored in said memory.

Each memory may furthermore comprise an instant t starting from which said activation signal is sent to the energy saving device, as well as the period of time P, elapsing starting from the instant t, over which the activation signal is sent to the energy saving device.

The communication of the server with the sub-stations and the energy saving devices may be conducted by internet.

Still other particularities and advantages of the invention will appear in the following description.

BRIEF DESCRIPTION OF THE DRAWINGS

The invention, according to an example embodiment, will be well understood and its advantages will be clearer on reading the following detailed description, given by way of illustrative example that is in no way limiting, with reference to the accompanying drawings in which.

FIG. 1 illustrates an example of an air conditioning system for which the method of the present document may be implemented.

FIG. 2 illustrates the steps of an example of a method of measuring an effective reduction in energy consumed by at least one air conditioning system;

FIG. 3 illustrates a first example of an activation signal that can be used in implementing the present method;

FIG. 4 illustrates a first second example of an activation signal that can be used in implementing the present method;

FIG. 5A illustrates a third example of an activation signal;

FIG. 5B illustrates the power response of the supply network in response to the activation signal illustrated in FIG. 5A;

FIG. 6 illustrates a management system able to implement the method presented in the present document; and FIG. 7 illustrates the calculating steps for the method of the present document implemented by a server of the management system of FIG. 3.

Identical parts represented in the aforementioned figures are identified by identical numerical references.

DETAILED DESCRIPTION

The invention finds an application in the field of passenger transport vehicles supplied by an electricity network, in particular in rail transport vehicles, whether they be dedicated to traveling long distances or short distances, such as vehicles for urban rail transport, for example such as subways and tramways.

The invention applies in particular to a fleet or set of passenger transport vehicles, each vehicle comprising at least one air conditioning system.

In particular, the invention relates to the use of an energy saving device, used in order to reduce the electrical energy consumption of on-board equipment of vehicles. The on-board equipment in electric transport vehicles are numerous; air conditioning systems as well as traction systems may be cited as examples.

Such energy saving devices, which have been the subject of a patent application FR3051424, make it possible in particular to synchronize the consumption of electrical energy of equipment with operating phases of transport vehicles of the fleet in braking phase, and thus producing electrical energy through a braking energy recovery device.

In the interest of simplicity, the invention is described below by taking as an equipment example an on-board air conditioning system. Of course, the invention may also be applied to any type of equipment, for example such as a braking system.

In general, a rail type passenger transport vehicle is equipped with several air conditioning systems. By air conditioning system below in this document is meant a system able to cool or heat the cabin or cabins of a rail vehicle. The air conditions of each cabin of the passenger transport vehicle are regulated by an air conditioning system. For example, in a rail vehicle, each wagon has an air conditioning system regulating its own air conditions. In other examples, a same air conditioning system can regulate the air conditions of several vehicles.

In the interest of simplicity, it is considered in this document that each passenger transport vehicle of a fleet of vehicles comprises a single air conditioning system. Nevertheless, as indicated above, a vehicle may comprise several air conditioning systems. For example, a vehicle could comprise as many air conditioning systems as cabins.

Therefore, in what follows, an air conditioning system of a vehicle refers to an air conditioning system associated with at least one vehicle cabin. Furthermore, the temperature of a vehicle refers to the temperature of at least one cabin of the vehicle.

FIG. 1 shows an air conditioning system comprising an energy saving device. The method for measuring a reduction in energy consumed by the network supplying a fleet of electric vehicles according to the invention may be applied to such an air conditioning system, of which the energy consumed may be reduced by the use of the energy saving device.

The air conditioning system 1 is mounted in an electric transport vehicle 100. The electric transport vehicle 100 is supplied by an electricity supply network 2.

The air conditioning system 1 comprises at least one actuator such as a compressor, fans, heating resistors, etc.

In FIG. 1, only one actuator 3 is shown in order to simplify the Figure. In this illustrated example, the actuator as such is a compressor 3a, the operation of the compressor 3a being effected by a motor 3b, the motor being 3b being supplied by a variable frequency invertor 3c.

It will be noted that the actuator 3 produces heat (for example in so-called "reversible" air conditioning systems) or cold.

The air conditioning system 1 further comprises the regulating system 6 configured to generate commands for operating the actuators 6c, such as a command controlling the speed of the motor 3b actuating the compressor 3a.

Of course, the commands for operating the actuators 6c comprise other commands not shown in the Figures, such as commands controlling the speed of the fans, the switching of the heating resistors, etc.

Thus, the commands for operating the actuators 6c are signals output from the regulating system 6.

The regulating system 6 receives as input a first set of parameters representing air conditions 6a.

The set of the parameters representing the air conditions 6a, in the embodiment represented, comprise the temperature inside and outside the vehicle 100, and the level of $CO_2$. These parameters are conventional parameters in an air conditioning system. Other parameters may be used such as humidity.

The air conditioning system 1 further comprises an energy saving device. This energy saving device is configured to send a command 8a to the regulating system 6 in order for the latter to take into consideration a second set of parameters 6b. The second set of parameters 6b comprises parameters relative to at least one electric transport vehicle 6b of the fleet. The value of the parameter indicates whether the electrical energy is consumed by said at least one electric transport vehicle, or if the electrical energy is produced by said at least one electric transport vehicle.

It will be noted that said at least one parameter relative to at least one electric transport vehicle 6b may be relative to the electric transport vehicle on which is mounted the air conditioning system 1, to a second electric transport vehicle supplied by the same electricity supply network 2, or to several electric transport vehicles supplied by the same electricity supply network 2.

The value of the parameter relative to at least one electric transport vehicle 6b depends for example, on the actions relative to the driving of the vehicle. An action relative to the driving of a vehicle may be the electric braking or the traction. Thus, a parameter representing an action relative to the driving may be an electric braking force or traction force, its value representing the level of electric braking force or traction force respectively.

Thus, for example, the value of the parameter relative to at least one electric transport vehicle may be:
- a value of electrical power, or of a traction load, or of a braking load, or of a distance, or of a velocity, or of an acceleration, or
- a value representing a state of opening or of closing of the doors of said electric transport vehicle (the opening and the closing of the doors being actuated when the vehicle is stopped), or
- a value of a voltage of said electricity supply network 2 supplying said at least one electric transport vehicle.

It will be noted that when an electric transport vehicle equipped with a braking energy recovery device, supplied by the electricity supply network brakes using its traction motors (the action relative to driving being a braking action), the voltage on the electricity supply network increases if the electric transport vehicle is designed such that the electrical energy produced by its motors is sent back to the electricity supply network 2.

On the contrary, when at least one electric transport vehicle supplied by the electricity supply network 2 applies a traction force (the action relative to driving being traction), the voltage value of the electricity supply network reduces.

In the embodiment shown, the parameters 6b relative to at least one vehicle comprise a traction force, a braking force, a value representing an open or closed state of the doors, and the measured voltage of the electricity supply network 2. In one embodiment, an accelerometer may be used to deduce the operating phases of the train, that is to say whether the train is in traction phase, stopped or is coasting. In other words, the parameters relative to the traction force, the braking force, as well as the parameters relative to the fact that the vehicle is in locomotion or is stopped on the rails, are deduced from a signal coming from an on-board accelerometer in the vehicles 100 of the fleet.

In the embodiment described in FIG. 1, the air conditioning system further comprises means for measuring the voltage 7 of the electricity supply network 2, in order to generate, as input to the energy saving device 8, a value of a parameter relative to at least one electric transport vehicle supplied by the electricity supply network 2.

The energy saving device 8 is thus configured to be activated or deactivated via an activation signal 12. When the energy saving device 8 is activated, the energy saving device is configured to send a command 8a to the regulating system 6 which is configured to then generate the operating commands 6c applied to the actuators according to values of the parameters representing the air conditions 6a as well as according to the value of at least one parameter 6b relative to at least one vehicle 100 indicating that electrical energy is consumed by said at least one electric transport vehicle 100 or that electrical energy is produced by said at least one electric transport vehicle 100. When the energy saving device 8 is deactivated, no command 8a is sent to the regulating system 6. In this case, the regulating system is then configured to generate the operating commands 6c applied to the actuators only according to values of the parameters representing the air conditions 6a.

Of course, may be that that some only of the electric transport vehicles are equipped with such an energy saving device 8. In another embodiment, each of the electric transport vehicles of the fleet may be equipped with one or more energy saving devices 8 for one or more items of on-board equipment in the vehicles 100.

The invention is directed to evaluating the electrical energy saving provided by the electricity network for the supply of the vehicle fleet 100, through using such energy saving devices 8.

FIG. 2 illustrates the general principle of method 20 according to the present document, directed to measuring an effective reduction in energy consumed by the electricity network supplying the vehicle fleet comprising one or more vehicles comprising the on-board air conditioning system as described in relation to FIG. 1, in an electric vehicle 100 of a fleet of electric vehicles.

The air conditioning systems 1, according to the command 6c sent by the regulating system 6, operate with energy provided by the electricity network to which the vehicles are connected, and/or energy produced by one or more vehicles 100 of the fleet in braking phase.

The method 20 is directed to determining an energy saving achieved, that is to say to quantify the difference in energy arising from the activation signal 12, and only due to it.

The first step S1 of the method 20 is directed to sending, over a period of time P, an activation signal 12 to each energy saving device 8 of each item of equipment 1, said activation signal 12 being able to activate and deactivate said energy saving device 8 alternatingly over said time interval P.

This step is directed to suspending the action of some or all of the energy saving devices 8 present in the vehicle fleet. For this, the activation signal 12 is sent simultaneously to all or some of the energy saving devices 8 present in the fleet.

The activation signal 12 is a signal configured to activate or deactivate the energy saving devices 8, so as to activate or deactivate the production of a command 8a in order for the regulating systems 6 to take into consideration the parameters 6b on generating operating commands 6c. The activation signal 12 thus makes it possible in part to inhibit the energy saving devices 8, and thus suspend the taking into consideration of the parameters 6b on generating the operating command 6c for the actuators 3. At the time of this inhibition of the energy saving devices 8, the air conditioning systems 1 consume continuously. In other words, at the time of the inhibition of the energy saving devices 8, the consumption by the air conditioning systems 1 is no longer synchronized with the phases of operation of the vehicles 100 of the fleet producing electrical energy (in particular when these vehicles are in braking phase and produce energy through a device for recovering braking energy). In this case, only the air conditions 6a are taken into consideration to control the air conditioning systems 1.

The second step S2 of the method 20 is to obtain a signal of electrical power consumed over the period of time P by the electricity network supplying the vehicles 100.

The signal of the electrical power consumed by the electricity network may be obtained directly via measuring means provided for the electricity network to which the vehicles 100 are connected. Of course, it may be envisioned for such measuring means to be on-board measuring means in each of the vehicles 100 of the fleet. The measuring means may for example comprise an electricity meter.

The third step S3 of the method 20 is to deduce a reduction in energy consumed by the electricity network in response to said activation signal 12.

Based on the signal of electrical power consumed by the electricity network, the method is directed to extracting information relative to electrical power bearing a resemblance to the activation signal. As a matter of fact, the signature of the activation signal 12, that is to say its form, impacts the signal of power consumed by the air conditioning systems 1 comprising energy saving devices 8 receiving the activation signal 12. This is explained in more detail in relation to FIG. 7.

Therefore, the activation signal 12 is chosen such that its signature cannot be confused with components of the signal of the electrical power consumed by the electricity network.

The cross-correlation between the signal of power consumed by the electricity network and the activation signal 12 makes it possible, in addition to obtaining information in relation to the resemblance between the signal of power consumed by the electricity network and the activation signal 12, to obtain the value of the energy saved.

For example take the example of FIG. 5A, illustrating an activation signal 12 able to have two values, +1 and −1, respectively corresponding to the activation and the deactivation of the taking into account of the parameters 6b by the regulating system, in response to the command 8a sent by the energy saving device 8.

The signal of power consumed 50 by the electric supply network, including the air conditioning systems 1 receiving the activation signal illustrated in FIG. 5A, is illustrated in FIG. 5B.

The cross-correlation between these two signals 12″, 50 is expressed in the following manner:

$$I_{p,sa(\tau)} = \int_{t_1}^{t_5} P(t) \times sa(t+\tau) dt$$

with P(t) being the signal of power consumed 50 by the network and sa(t) being the activation signal 12.

In this particular case, it is considered that the response time of the air conditioning systems 1, that is to say the transitional conditions of the energy saving devices 8 upon activation and deactivation, is negligible in relation to the change in the signal of power consumed 50. Therefore, it is considered that the time of delay on the x-axis between the signal of power consumed 50 by the network and the activation signal 12″ is zero.

In the example of FIGS. 5A and 5B, the cross-correlation at 0 (that is to say for $\tau=0$) can be broken down as follows:

$$I_{p,sa(0)} = \int_{t_1}^{t_5} P(t) \times sa(t) dt = \int_{t_1}^{t_2} P(t) dt - \int_{t_2}^{t_3} P(t) dt + \int_{t_3}^{t_4} P(t) dt - \int_{t_4}^{t_5} P(t) dt = E_{ON} - E_{OFF}$$

with $E_{ON}$ and $E_{OFF}$ respectively being the average energy consumed by the electricity network when the energy saving device 8 is active (over the transition periods between the instants $t_1$ and $t_2$, $t_3$ and $t_4$) and when the energy saving device 8 is inactive. Thus, the cross-correlation between the activation signal 12 and the signal of power consumed corresponds to the difference between the average energies consumed by the network when:

the energy saving devices 8 are inhibited by the activation signal 12 (OFF); and the energy saving devices 8 are operational (when the value of the activation signal corresponds to ON).

Therefore, this cross-correlation at zero makes it possible to extract the energy saved over the period of evaluation of the energy saving, that is to say the period over which the activation signal is sent.

Of course, the choice of the activation signal 12, as described with reference to FIGS. 3 to 5, makes it possible to optimize the calculation of the energy saved. In particular, the activation signal 12 must be configured to simultaneously inhibit the energy saving devices 8 of all the air conditioning systems 1 such as described with reference to FIG. 1 and present in the fleet of vehicles 100. Furthermore, this inhibition of the energy saving device 8 must not be for a duration such that the method 20 impacts too greatly the energy saving enabled by the air conditioning systems 1 such as described in FIG. 1.

Examples of activation signals 12 are illustrated in FIGS. 3,4 and 5A.

In the example illustrated here, the activation signal 12 is a digital signal. It is configured to take two discrete values, for example 1 and 0, each of these discrete values respectively corresponding to the powering up of the energy saving device 8 (ON) and to the stoppage of the energy saving devices 8 (OFF).

The activation signal 12 may thus be a variation of a constant between two values, 1 and 0, for a period of time P.

Each of these activation signals 12 is characterized by transition periods. By transition period is meant the period of time between two transitions of the value of the signal from 0 to 1 or vice-versa. In other words, this may be a length of time during the period of time P, over which the value of the activation signal 12 is constant, between two switching operations.

In a first example of an activation signal 12 of FIG. 3, this signal is characterized by the transition periods $T_1$, $T_2$, $T_3$, $T_4$, $T_5$ and $T_6$.

Thus, the examples of activation signals 12' and 12" of FIGS. 4 and 5A, are also characterized by transition periods (of different lengths).

As illustrated, the transition periods $T_1$, $T_3$, $T_5$ in which the signal is at 1, and the transition periods $T_2$, $T_4$ and $T_6$ in which the signal is at 0, do not necessarily have the same durations. In the example illustrated in FIG. 4 for example, the transition periods are of different durations comprised between 22 minutes and 31 minutes.

In one embodiment, the activation signal 12 may be obtained by random picking of values for the transition periods between 20 and 45 minutes, as represented on the activation signals 12' and 12" of FIGS. 4 and 5A.

In general, the transition periods $T_1$, $T_2$, $T_3$, $T_4$, $T_5$ and $T_6$ are dimensioned so as to:

give the activation signal 12 its own identity which cannot be confused with events occurring during the utilization of the air conditioning system 1 in the vehicle 100. By way of example, the transition periods $T_1$, $T_2$, $T_3$, $T_4$, $T_5$ and $T_6$ are chosen so as not to be equal to the journey time of the vehicle 100 between two stations (whether successive or not), for example such as between the terminus stations of the line considered.

be longer than the duration of the transition conditions of the energy saving devices 8. As a matter of fact, the activation signal 12 is sent to each of the energy saving devices 8 and turns it on or off according to the change in value of the activation signal 12. The transition period $T_1$, $T_2$, $T_3$, $T_4$, $T_5$ and $T_6$ must therefore be chosen so as to be greater than the time required for the energy saving device 8 to stabilize after powering up. The stabilization time being 90 seconds on average for the energy saving device 8 presented with reference to FIG. 1, the period can thus be chosen greater than at least three times the stabilization time (270 seconds), and preferably greater than ten times the stabilization time, that is to say greater than 900 seconds.

not inhibit the energy saving device 8 over too long a duration which would impact the energy savings obtained by its use, that is to say to limit the transition periods $T_2$, $T_4$ and $T_6$ when the activation signal is at 0, to a maximum duration of approximately 20% of the duration of operation of the vehicle, preferably 5% of the duration of utilization of the vehicle.

By way of illustration, the period of time P may be permanent or of a minimum duration of one day. In this time period P, the activation signal 12 may be sent either continuously or discontinuously.

The activation signal 12 may be sent several times over the period P. For example, two successive sendings of the activation signal 12 may be spaced by a stoppage time the value of which may come from random picking. For example, the values of stoppage times may be the result of random picking of values between 20 and 45 minutes. This makes it possible in particular to reduce the impact of the present method 20 on the energy savings achieved. It is decisive in the choice of activation signal 12 to choose transition periods $T_1$, $T_2$, $T_3$, $T_4$, $T_5$ and $T_6$ such that the activation signal 12 is distinguished from and differentiated from the characteristics of the power consumed by the electricity network or produced by the vehicles 100 of the fleet.

For this, the activation signal 12 may be chosen such that the modulus the Fourier transform of the activation signal 12 has a maximum amplitude for frequencies for which the amplitude of the modulus of the Fourier transform of the signal of the power consumed 50 by the electricity network is minimum.

In other words, a frequency spectrum of the signal of power consumed 50 by the electricity supply network 100 of the fleet is expressed as a function of the modulus of the Fourier transform of the signal of power consumed 50 by the electricity network. Once this first frequency spectrum has been obtained, a range of frequency values is identified for which the amplitude of this first spectrum is minimum.

The activation signal 12 is then determined and configured such that its frequency spectrum, expressed according to the Fourier transform modulus, has a maximum amplitude for frequencies chosen in the identified range of frequency values.

Therefore, for the identified frequencies, the amplitude spectrum of the power consumed 50 by the electricity network is a minimum and the amplitude spectrum of the activation signal 12 is a maximum.

Ideally, the activation signal 12 is chosen such that the set of frequencies of the amplitude of the Fourier transform modulus of the activation signal 12 are disjoint from the set of frequencies of the amplitude of the Fourier transform modulus of the signal of power consumed 50 by the electricity network.

It may be that the activation signal 12 is sent to only some of the electric transport vehicles 100 of the fleet. In this case, it may be that the activation signal 12 is sent only to a sufficient number of electric vehicles 100. The energy saving may then be extrapolated for all the air conditioning systems 1 of the fleet of vehicles 100.

It may be that the activation signal 12 is not sent every day. An average for the energy saving is then deduced for the days for which the activation signal 12 was sent. This makes it possible to reduce the duration for which the energy saving device is deactivated, and thus make a greater saving on energy consumed by the equipment, and thus by the electricity network.

The characteristics of the activation signal 12 are chosen according to whether it is desired to evaluate an energy saving achieved over a week, a month or a year of utilization.

In one embodiment, the measurement of the energy savings using the method 20 may be executed continuously when exploiting the vehicles 100 of the fleet, or over periods of time, called energy saving evaluation periods. The period of time P may be equal to that energy saving evaluation time.

Thus, the activation signal 12 as described is neither correlated to the air conditions, nor to the conditions of operation of the electric transport vehicles. Therefore, the signature of this signal, that is to say the form or specific mark of the activation signal 12, cannot be confused with external phenomena linked to the utilization of the vehicles 100. The signature of the activation signal 12 characterizes the energy consumed by the electricity network. This is described in more detail with reference to FIGS. 6 and 7.

This activation signal 12 may be sent to the energy saving devices 8 by a server or by a microprocessor associated with a memory in which is stored information relative to the activation signal 12.

The first case is illustrated in FIGS. 6 and 7.

In the second case, a programmable card, comprising at least the microprocessor coupled to the memory, is carried by the air conditioning system 1. Furthermore, the memory comprises an instant t, such as a date and a time, starting from which said activation signal 12 is sent to the regulating system 6, as well as the period of time P, running from the instant t, over which the activation signal 12 is sent to the regulating system 6. Thus, all the programmable cards are programmed identically such that the air conditioning systems 1 of the fleet are configured to send the activation signal 12 simultaneously to the energy saving device 8 at the instant t over a period P.

Of course, these data may be modified in memory by a user, either in relation to all the air conditioning systems 1, or in relation to an air conditioning system 1 able to communicate the information relative to an activation signal 12, an instant t and a period of time P, with the other air conditioning systems 1 of the fleet.

If the data in memory of the air conditioning systems 1 are not uniform, a warning is sent to the server, indicating that the calculation relative to the energy saving has been under- or over-evaluated.

When the fleet of electric transport vehicles 100 comprises several vehicles 100 in which there are on-board air conditioning systems 1 such as illustrated in FIG. 1, the activation signal 12 is sent simultaneously to each or some of the energy saving devices 8.

FIG. 6 illustrates an example of a management system 60 suitable for implementing the method according to the invention.

The electric transport vehicles 100 are supplied by an electricity network 61 comprising several sub-stations 62, 63 and 64. The sub-stations 62, 63 and 64 are points of supply of the electricity network 61, which send electrical energy to the network. The sub-stations 62, 63 and 64 may for example be energy converters, distributed along the network and connected in parallel or in series to the network.

There may be distinct supply zones, such as zones of supply by catenary or by the ground for example, these zones not necessarily being jointed together. Each sub-station is equipped with a measuring means or electric meter 65, 66, 67, able to measure the signal of electrical power consumed at each of these sub-stations 62, 63 and 64.

Thus, the power measured at each sub-station 62, 63 and 64 is the power consumed by the sets 100a, 100b and 100 of vehicles 100 connected to said sub-stations 62, 63 and 64. By way of example, the measuring means 62 thus makes it possible to measure the electrical power consumed by the set 100a of vehicles 100 connected to and supplied by the sub-station 62.

Each of the vehicles 100 of the fleet comprises an air conditioning system 68, 69 and 70 as illustrated in FIG. 1. Each of these air conditioning systems 68, 69 and 70, in particular each of the energy saving devices 8 considered, is configured to simultaneously receive an activation signal 12, such as described with reference to FIGS. 3 to 5.

Thus, the electrical power consumed and measured at the sub-stations 62, 63 and 64 includes the electrical power consumed by the air conditioning systems 68, 69 and 70 of the vehicles of the fleet.

The powers measured, over the period of time P, at each of these sub-stations 62, 63 and 64 are sent to the server 71. The sub-stations 62, 63 and 64 are each connected to the server 71 by wired or wireless connection.

Once the powers consumed at each of the sub-stations 62, 63 and 64 have been received by the server 71, calculations are carried out at the server 71 in order to evaluate the energy saving achieved over the period P, as illustrated in FIG. 7.

In a first phase, the signal of total electrical power consumed by the electricity network is deduced from the powers consumed at each sub-station 62, 63 and 64 received by the server 71, over the evaluation period P for evaluating energy savings. The signal of total electrical power consumed by the electricity network is obtained by summing the signals of electrical power consumed by each sub-set of vehicles 100a, 100b and 100 of vehicles 100 connected respectively to said sub-stations 62, 63 and 64 and the joule heating losses arising from the electricity network.

A filter 75 may be used to filter the signal of total electrical power consumed to remove from the signal part of the electrical power corresponding to the noise having an evident and known signature.

For example, traffic signaling and public lighting in a station can impact the signal of measured electrical power consumed. As a matter of fact, the drawing of current on traffic signaling can lead to variations in the signal of power consumed by the electricity network. The variations caused may be great, and thus have to be filtered in order for them not to be attributed erroneously to the action of the devices. This filtering may be achieved via an algorithm, implemented at the server.

Thus, the filter 75 makes it possible to identify a signature of an event linked to the utilization of the fleet in order to extract it from the signal of power consumed by the electricity network. This signature is considered a noise, and will thus not be taken into consideration for the rest of the method, in particular to evaluate the energy saving made.

Next, a cross-correlation is made between the signal of the total power consumed by the electricity network and the activation signal 12.

The cross-correlation here consists of identifying, in the signal of total power consumed by the electricity network, components of power having a similar form to the signature of the activation signal 12. As a matter of fact, given that the action of the energy saving devices 8 depends on their activation or deactivation by the activation signal 12, the signal of power consumed by the air conditioning systems 1 is thus impacted.

As explained earlier, in relation to FIGS. 5A and 5B, the reduction in energy consumed by the set of air conditioning systems 68, 69 and 70 is deduced from this cross-correlation which is equal to the difference between:

- an average electrical energy consumed by the electricity network over the period P when said energy saving devices 8 are powered on ($E_{ON}$);
- an average electrical energy consumed by the electricity network over the period P when said energy saving devices 8 are not powered on ($E_{OFF}$);

The average electrical energy consumed by the electricity network when the energy saving device 8 is powered on, corresponds to the energy consumed by the electricity network when the activation signal 12 has a value ON, over the period P. For example, this is the energy consumed in transition periods T1, T3 and T5 of the activation signal illustrated in FIG. 3. The average energy consumed by the electricity network is then equal to the sum of the energies consumed in the transition periods in which the activation signal has a value ON, divided by the sum of these transition periods T1, T3 and T5, over the period P.

Similarly, the average energy consumed by the electricity network when the energy saving device 8 is off is then equal to the sum of the energies consumed in the transition periods T2, T4 and T6 in which the activation signal has a value OFF, divided by the sum of these transition periods T2, T4 and T6, over the period P.

Taking the example of the activation signal 12 of FIG. 3, the energies $E_{ON}$ and $E_{OFF}$ are expressed:

$$E_{ON} = \frac{E_{T1} + E_{T3} + E_{T5}}{T_1 + T_3 + T_4} \text{ and}$$

$$E_{OFF} = \frac{E_{T2} + E_{T4} + E_{T6}}{T_2 + T_4 + T_6}$$

Based on these averages of consumed energy $E_{ON}$ and $E_{OFF}$, it is possible to estimate the energy saving on average obtained by virtue of the use of the air conditioning systems 68, 69 and 70, such as described with reference to FIG. 1, in vehicles 100 of the fleet.

The energy saving 74 is thus equal to the difference between the average energy consumed by the electricity network when the energy saving device 8 is active (that is to say powered on) and the average energy consumed by the electricity network when the energy saving device 8 is inactive (that is to say not powered).

The communication by the server 71 with the sub-stations and/or with the air conditioning systems 68, 69 and 70 of the fleet may be made by a two-way wireless link.

The embodiments detailed in the present application are not limiting. In particular, the energy saving device may be integrated or not integrated into the item of equipment on which the energy saving device acts.

It will be noted that in one embodiment, a parameter relative to at least one electric transport vehicle is relative to at least the electric transport vehicle comprising the energy saving device.

In another embodiment, a parameter relative to at least one electric transport vehicle is relative to at least one electric transport vehicle different from the electric transport vehicle comprising the energy saving device.

In this embodiment, the parameter relative to at least one electric transport vehicle is relative to several electric transport vehicles supplied by the electricity supply network.

The invention claimed is:

1. A method, comprising:
   sending an activation signal to an energy saving device of equipment onboard a vehicle, the activation signal configured to alternatingly activate and deactivate the energy saving device that applies an operation control signal to the equipment onboard the vehicle, the operation control signal generated based on electrical energy produced from braking of the vehicle;
   obtaining a consumption signal indicative of electrical power consumed by an electricity supply network supplying the electrical power to a vehicle fleet that includes the vehicle; and
   deducing a reduction in the electrical power consumed by the electricity supply network in response to the activation signal.

2. The method according to claim 1, wherein a frequency spectrum of the activation signal has an upper amplitude for frequencies of the consumption signal having a lower amplitude in an absence of the activation signal, the energy saving device being either activated or deactivated repeatedly.

3. The method according to claim 1, wherein the activation signal is a digital signal configured to have at least two discrete values comprising a first value corresponding to activation of the energy saving device, and a second value corresponding to deactivation of the energy saving device.

4. The method according to claim 1, wherein the activation signal comprises transition periods in which a value of the activation signal is constant, the transition periods being longer than a duration of transition conditions of the energy saving device.

5. The method according to claim 4, wherein durations of the transition periods are randomly obtained.

6. The method according to claim 1, wherein deducing the reduction in the electrical power consumed by the electricity supply network comprises:
   calculating the electrical power consumed by the electricity supply network while the energy saving device is activated;
   calculating the electrical power consumed by the electricity supply network while the energy saving device is deactivated; and
   calculating a difference between an average electrical power consumed by the electricity supply network while the energy saving device is activated and an average electrical power consumed by the electricity supply network while the energy saving device is deactivated.

7. The method according to claim 1, wherein deducing the reduction in the electrical power consumed by the electricity supply network comprises:
   calculating a cross-correlation between the consumption signal of the electrical power consumed by the electricity supply network and the activation signal.

8. The method according to claim 1, wherein the vehicle fleet includes electric transport vehicles distributed into sub-sets of the electric transport vehicles connected to a same sub-station of the electricity supply network, and the consumption signal of the electrical power consumed by the electricity network comprises:
   determining a sub-set consumption signal of the electrical power consumed by each of the sub-sets of the electric transport vehicles;

calculating the consumption signal by summing the sub-set consumption signals; and deducing the consumption signal of the electrical power consumed by the electricity supply network.

9. The method according to claim 8, wherein the subs-set consumption signal is determined and transmitted to a server by each of the sub-stations of the electricity network.

10. The method according to claim 9, wherein the activation signal is sent by the server, which sends a same activation signal simultaneously to each of the energy saving devices in the vehicle fleet of the electric transport vehicles.

11. The method according to claim 1, the activation signal is stored and sent from a memory carried in the equipment.

12. The method according to claim 11, further comprising:

storing, in the memory, a time at which the activation signal is sent to the energy saving device and a period of time starting from the time over which the activation signal is sent to the energy saving device.

\* \* \* \* \*